(12) United States Patent
Rose

(10) Patent No.: US 6,314,500 B1
(45) Date of Patent: *Nov. 6, 2001

(54) SELECTIVE ROUTING OF DATA IN A MULTI-LEVEL MEMORY ARCHITECTURE BASED ON SOURCE IDENTIFICATION INFORMATION

(75) Inventor: James Allen Rose, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,314

(22) Filed: Jan. 11, 1999

(51) Int. Cl.[7] .................................................... G06F 12/00
(52) U.S. Cl. ............................................ 711/148; 711/153
(58) Field of Search ................................... 711/118, 122, 711/129, 141, 146, 147, 150, 153, 155, 170, 171, 172, 173; 709/104, 105

(56) References Cited

U.S. PATENT DOCUMENTS

| | | | |
|---|---|---|---|
| 5,420,991 | * 5/1995 | Konigsfeld et al. ................. | 711/150 |
| 5,572,703 | * 11/1996 | MacWilliams et al. ............. | 711/146 |
| 5,623,628 | * 4/1997 | Brayton et al. ....................... | 711/141 |
| 5,751,995 | * 5/1998 | Sarangdhar ........................... | 711/145 |
| 5,802,563 | * 9/1998 | Hagersten et al. .................... | 711/122 |
| 5,829,032 | * 10/1998 | Komuro et al. ...................... | 711/141 |
| 5,987,571 | * 11/1999 | Shibata et al. ........................ | 711/141 |
| 6,018,763 | * 1/2000 | Hughes et al. ........................ | 709/213 |
| 6,081,873 | * 6/2000 | Hetherington et al. .............. | 711/131 |

* cited by examiner

Primary Examiner—Matthew Kim
Assistant Examiner—Christian P. Chace
(74) Attorney, Agent, or Firm—Wood Herron & Evans

(57) ABSTRACT

A data processing system, circuit arrangement, integrated circuit device, program product, and method utilize source identification information to selectively route data to different memory sources in a shared memory system. This permits, for example, data to be routed to only a portion of the memory sources associated with a given requester, thereby reducing the bandwidth to other memory sources and reducing overall latencies within the system. Among other possible information, the source identification information may include an identification of which memory source and/or which level of memory is providing the requested data, and/or an indication of what processor/ requester and/or what type of instruction last modified the requested data.

27 Claims, 3 Drawing Sheets

SELECTIVE ROUTING OF DATA IN A MULTI-LEVEL MEMORY ARCHITECTURE BASED ON SOURCE IDENTIFICATION INFORMATION

FIELD OF THE INVENTION

The invention is generally related to data processing systems and processors therefor, and in particular to retrieval of data from a multi-level memory architecture.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on system performance. Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like. In some instances, instructions and data are stored in separate instruction and data cache memories to permit instructions and data to be accessed in parallel. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant degradation in performance.

Another manner of increasing computer performance is to use multiple microprocessors operating in parallel with one another to perform different tasks at the same time. Often, the multiple microprocessors share at least a portion of the same memory system to permit the microprocessors to work together to perform more complex tasks. The multiple microprocessors are typically coupled to one another and to the shared memory by a system bus or other like interconnection network. By sharing the same memory system, however, a concern arises as to maintaining "coherence" between the various memory sources in the shared memory system.

For example, in a typical multi-processor environment, each microprocessor may have one or more dedicated cache memories that are accessible only by that microprocessor, e.g., level one (L1) data and/or instruction cache, a level two (L2) cache, and/or one or more buffers such as a line fill buffer and/or a transition buffer. Moreover, more than one microprocessor may share certain caches and other memories as well. As a result, any given memory address may be stored from time to time in any number of memory sources in the shared memory system.

Coherence is typically maintained via a central directory or via a distributed mechanism known as "snooping", whereby each memory source maintains local state information about what data is stored in the source and provides such state information to other sources so that the location of valid data in the shared memory system can be ascertained. With either scheme, data may need to be copied into and/or out of different memory sources to maintain coherence, e.g., based upon whether a copy of the data has been modified locally within a particular memory source and/or whether a requester intends to modify the data once the requester has access to the data. Any time data is copied into or out of a particular memory source, however, the memory source is temporarily unavailable and the latency associated with accessing data stored in the source is increased.

As a result, it is often desirable for performance considerations to minimize the amount of data transfers, or bandwidth, between memory sources in a shared memory system. Minimizing data transfers with a particular memory source increases its availability, and thus reduces the latency required to access the source.

Many shared memory systems also support the concept of "inclusion", where copies of cached memory addresses in higher levels of memory are also cached in associated caches in lower levels of memory. For example, in the multi-processor environment described above, all memory addresses cached in the L1 cache for a microprocessor are also typically cached in the L2 cache for the same microprocessor, as well as within any shared caches that service the microprocessor. Consequently, whenever a processor requests data stored in the shared memory system, the data is typically written into each level of cache that services the processor.

Inclusion is beneficial in that the number of snoops to lower level caches can often be reduced given that a higher level cache includes directory entries for any associated lower level caches. However, having to write data into multiple memory sources occupies additional bandwidth in each memory source, which further increases memory access latency and decreases performance. Furthermore, storing multiple copies of data in multiple memory sources such as caches reduces the effective storage capacity of each memory source. With a reduced storage capacity, hit rates decrease, thus further reducing the overall performance of a shared memory system. Moreover, particularly with a snoop-based coherence mechanism, as the number of memory sources that contain a copy of the same data increases, the amount of bandwidth occupied by checking and updating state information and maintaining coherence increases as well.

Therefore, a significant need continues to exist for a manner of increasing the performance of a shared memory system, particularly to reduce the bandwidth associated with each memory source and thereby decrease memory access latency throughout the system.

SUMMARY OF THE INVENTION

The invention addresses these and other problems associated with the prior art by providing a data processing system, circuit arrangement, integrated circuit device, program product, and method that utilize source identification information to selectively route data to different memory sources in a shared memory system. This permits, for example, data to be routed to only a portion of the memory sources associated with a given requester, thereby reducing the bandwidth to other memory sources and reducing overall latencies within the system. Consequently, as opposed to inclusion-based designs where every memory source associated with a given requester receives a copy of requested data, the routing of data may be more selective to ensure that data is made available in the most critical memory sources without necessarily tying up other memory sources for which the requested data is not particularly critical.

Source identification information may include, for example, an identification of which memory source and/or which level of memory is providing the requested data. As an example, it may be desirable to selectively route requested data to only the L1 cache for a particular processor, but not its L2 cache, if it is determined that the requested data is located in the L1 cache for another processor. By doing so, bandwidth to the L2 cache for the requesting processor is conserved, and the effective capacity of the L2 cache is increased since the unnecessary data is not stored in the L2 cache.

Source identification information may also include, for example, an indication of what processor/requester and/or what type of instruction last modified the requested data. In this latter instance, the source identification information could be used, for example, to enable data to be sent directly to a requester without occupying any additional memory sources when an accessing instruction correlated in some fashion with the particular instruction and/or requester that last modified the data.

Other types of information may also be maintained as source identification information as will become apparent from the disclosure hereinafter. Thus, the invention is not limited solely to the particular source identification information implementations described herein.

Consistent with one aspect of the invention, a method is provided for routing data in a multi-requester circuit arrangement including a plurality of requesters coupled to a plurality of memory sources, with each requester associated with at least a portion of the plurality of memory sources. The method includes responding to a memory request by a first requester among the plurality of requesters, including providing source identification information associated with the memory source that is returning the requested data; and, responsive to the source identification information, selectively routing the requested data to at least one of the memory sources associated with the first requester.

Consistent with another aspect of the invention, another method is provided for routing data in a multi-requester circuit arrangement. Rather than routing to at least one of the memory sources associated with a first requester, however, the requested data is routed directly to the first requester without routing the requested data to any of the memory sources associated with the first requester responsive to the source identification information.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The illustrated implementations of the invention generally operate by selectively routing requested data to memory sources associated with a particular requester in response to source identification information supplied by the memory source that is sourcing the requested data. A requester may be a processor or processing unit, or any other logic circuitry that utilizes data stored in a shared memory system, e.g., input/output adapters and/or interfaces, memory controllers, cache controllers, etc. A memory source, in turn, can include practically any data storage device or subsystem in a shared memory system from which identification and/or state information may be maintained, including main storage and various levels of cache memories, irrespective of the level of such cache memories, whether such cache memories are internal or external relative to a processor or other requester, whether such cache memories are data-only memories or collective data/instruction memories, whether such cache memories are dedicated to a particular requester or shared among several requesters, etc. A memory source can also include other shared or dedicated memories, including virtual memory, e.g., as implemented with one or more direct access storage devices in a page-based memory system. A memory source may also include memories distributed in a cache-only memory architecture (COMA) or a non-uniform memory architecture (NUMA) system. Furthermore, a memory source can also include other buffers or registers that may serve as a source for data, including translation lookaside buffers, processor registers, processor buffers, etc.

A memory source is considered to be associated with a particular requester when the memory source is dedicated to that requester, i.e., when the memory source services only one requester. A memory source may also be associated with a requester when the memory source services that requester along with other requesters, so long as that memory source is directly accessible by the requester or another memory source that is dedicated to that requester.

As discussed above source identification information may include, for example, an identification of which memory source and/or which level of memory is providing the requested data. Source identification information may also include, for example, an indication of what processor/ requester and/or what type of instruction last modified the requested data. Other types of information, including the state found in the sourcing memory, may also be used consistent with the invention.

Figure 1:
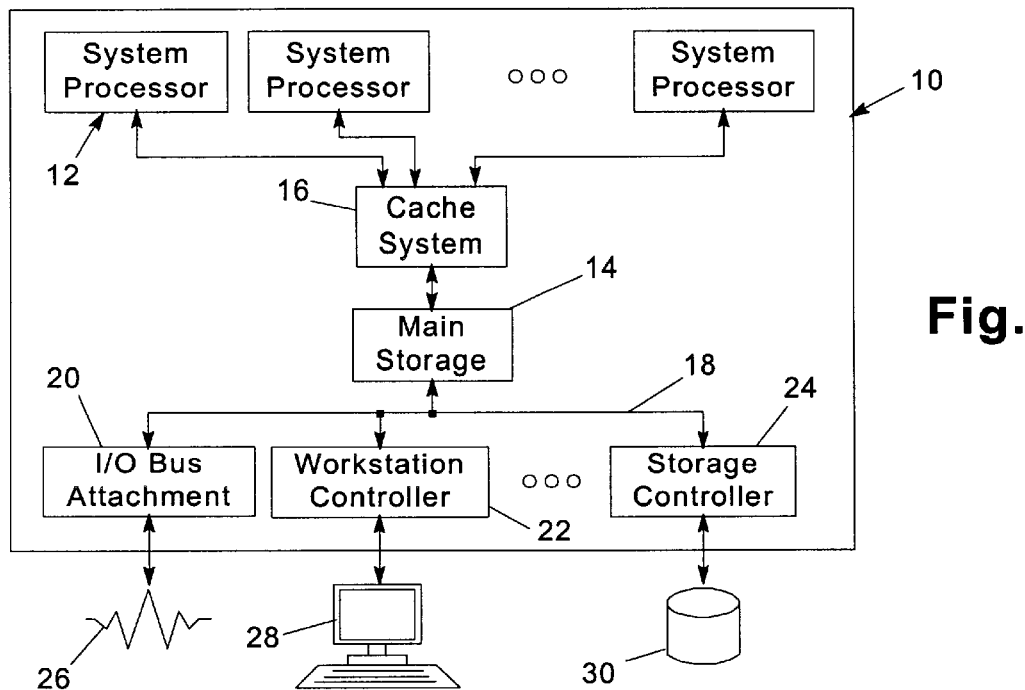
FIG. 1 is a block diagram of a data processing system consistent with the invention.

Turning to the Drawings, wherein like numbers denote like parts throughout the several views, FIG. 1 illustrates the general configuration of an exemplary data processing system 10 suitable for selectively routing requested data consistent with the invention. System 10 generically represents, for example, any of a number of multi-user computer systems such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other computing devices such as embedded controllers and the like. One suitable implementation of data processing system 10 is in a midrange computer such as the AS/400 computer available from International Business Machines Corporation.

Data processing system 10 generally includes one or more system processors 12 coupled to a memory subsystem including main storage 14, e.g., an array of dynamic random access memory (DRAM). Also illustrated as interposed between processors 12 and main storage 14 is a cache system 16, typically including one or more levels of data, instruction and/or combination caches, with certain caches either serving individual processors or multiple processors as is well known in the art. Moreover, as will be discussed below, at least some of the caches in cache system 16 may be integrated onto the same integrated circuit devices as one or more of system processors 12. Furthermore, main storage 14 is coupled to a number of types of external devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

It should be appreciated that data processing system 10 is merely representative of one suitable environment for use with the invention, and that the invention may be utilized in a multitude of other environments in the alternative. The invention should therefore not be limited to the particular implementations discussed herein.

Selective data routing consistent with the invention is typically implemented in a circuit arrangement disposed on one or more programmable integrated circuit devices, and it should be appreciated that a wide variety of programmable devices may utilize selective data routing consistent with the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Data routing consistent with the invention may be centralized within one or more central routing circuits. In the illustrated implementation, however, a snoopy coherence mechanism is used, and as such the data routing circuitry is distributed among the various requesters and sources, as well as response combining circuitry (discussed in greater detail below). It will be appreciated that the specific implementation of the logic discussed hereinafter for the data routing circuitry would be within the ability of one of ordinary skill in the art having benefit of the instant disclosure.

The shared memory system represented by data processing system 10 typically includes an addressable memory address space including a plurality of memory addresses. The actual data stored at such memory addresses may be maintained at any given time in one or more of system processors 12, main storage 14, caches 16, DASD 30, and/or within a workstation 28 or over a network 26. Moreover, for caching purposes, the memory address space is typically partitioned into a plurality of cache "lines", which are typically contiguous sequences of memory addresses that are always swapped into and out of caches as single units. By organizing memory addresses into defined cache lines, decoding of memory addresses in caches is significantly simplified, thereby significantly improving cache performance. By stating that a sequence of memory addresses forms a cache line, however, no implication is made whether the sequence of memory addresses is actually cached at any given time.

Figure 2:
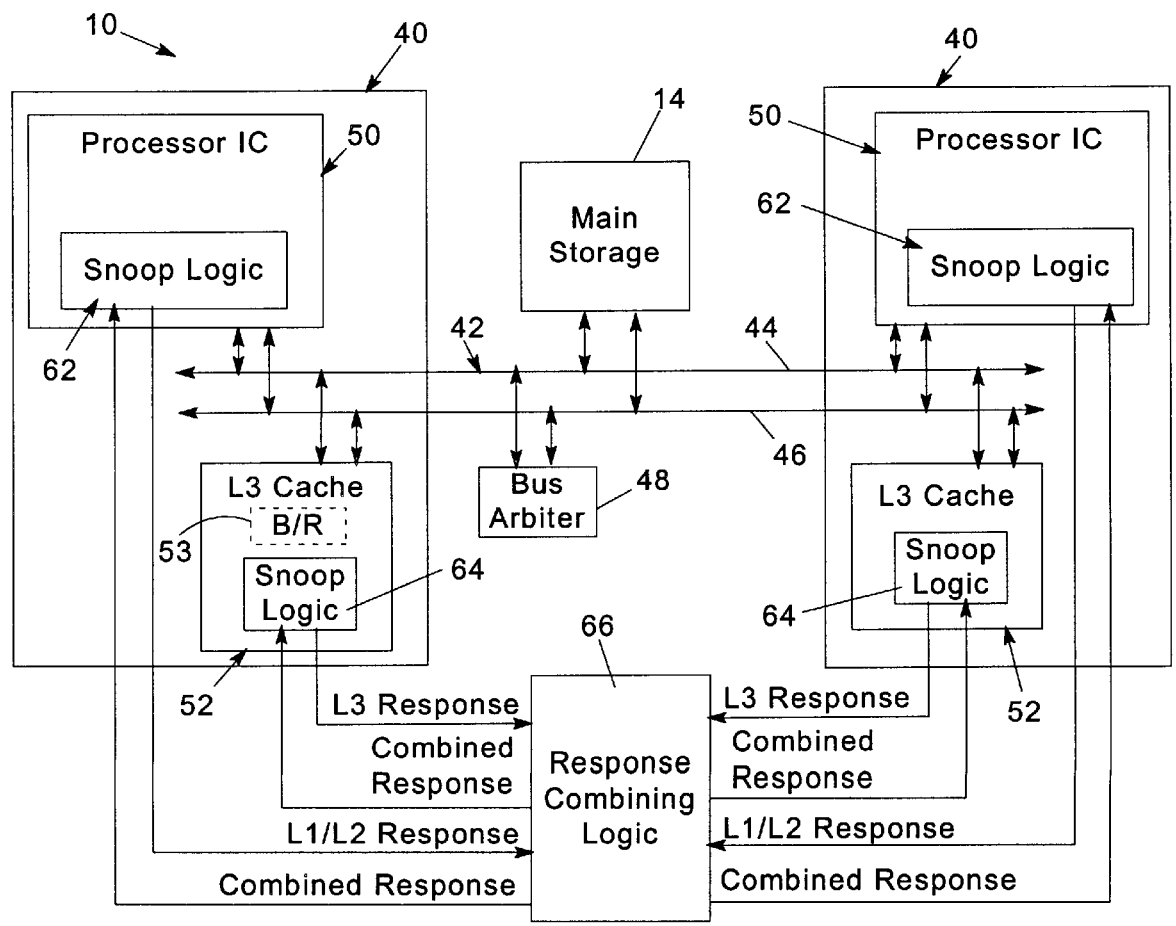
FIG. 2 is a block diagram of the shared memory architecture for the data processing system of FIG. 1.

As shown in FIG. 2, data processing system 10 implements a shared memory system incorporating a plurality of nodes 40 interfaced with main storage 14 over a shared interconnect such as a bus 42 incorporating address lines 44 and data lines 46. A bus arbiter 48 functions as a master for bus 42, in a manner known in the art.

Figure 3:
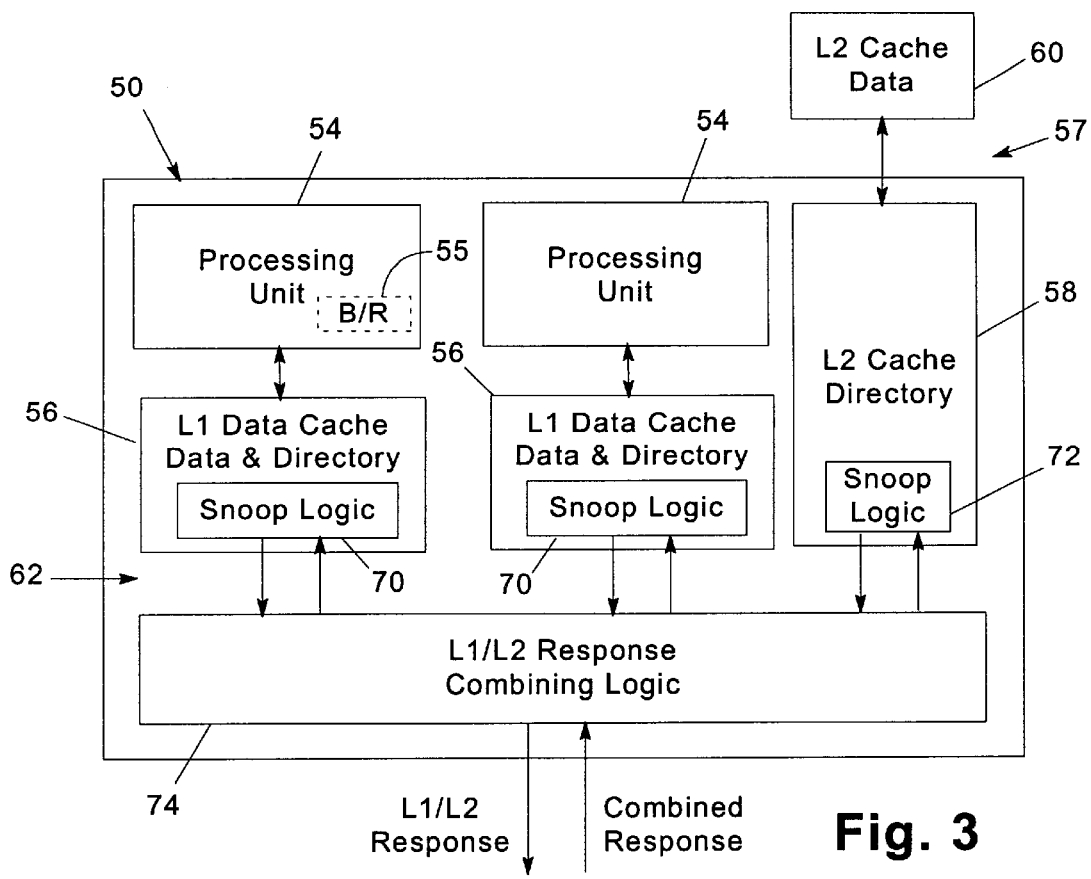
FIG. 3 is a block diagram of a processor integrated circuit device in the data processing system of FIG. 1.

Each node 40 includes a processor integrated circuit device 50 and an external L3 (tertiary) cache 52. Moreover, as shown in FIG. 3, each processor integrated circuit device 50 includes one or more processing units 54, each having a dedicated internal L1 (primary) data cache 56 associated therewith. The processing units, however, share an integrated instruction/data L2 (secondary) cache 57, shown as having an on-board controller/directory 58 coupled to off-chip memory storage devices 60. Also shown in FIGS. 2 and 3 are buffers/registers 53, 55 respectively disposed within L3 cache 52 and processing unit 54 that may function as additional destinations for data in certain embodiments (discussed below in greater detail).

In the context of the invention, a node may be considered to include any grouping of memory sources that are associated with one or more requesters. For example, a node may be defined at the processor or integrated circuit device level (e.g., within each processor integrated circuit device 50), at a card or board level, or at a system level, among others.

It should be appreciated that the shared memory system of FIGS. 2 and 3 is merely representative of one possible implementation. One skilled in the art will appreciate that any number and type of processors, as well as any number, type and level of caches and other memory sources, may be used in the alternative.

The shared memory system of data processing system 10 is illustrated as utilizing a snoopy coherence mechanism to permit a number of requester devices, e.g., each processing unit 54, to issue memory access requests that may access information stored in any memory source in the system, e.g., main storage 14 or any L1/L2/L3 cache in the system. In response to such memory access requests, the snoopy coherence mechanism updates the state of the memory address(es) in each memory source that is affected by the memory access requests. A snoopy coherence mechanism typically includes snoop logic, which receives memory access requests, determines the state of the memory address(es) in each memory source that are the subject of the requests, and outputs suitable local response signals representative of the states of the various memory sources. In addition, such snoop logic may also update the state of a memory address in each memory source in response to the request, as discussed in greater detail below.

In the illustrated embodiment, the snoop logic for data processing system 10 is distributed among a plurality of snoop logic circuits that are each associated with a particular memory source in the system. The snoopy coherence mechanism in the illustrated implementation is also implemented as a two-level coherence mechanism, with coherence maintained both at the processor level, as well as at the system level.

As shown in FIG. 2, at the system level, each memory source includes a dedicated snoop logic circuit, including a snoop logic circuit 62 for each processor integrated circuit device 50 and a snoop logic circuit 64 for each L3 cache 52. Response combining logic 66 is coupled to each of circuits 62, 64 to combine the responses therefrom and distribute a combined response to all memory sources.

As shown in FIG. 3, at the processor level, each snoop logic circuit 62 incorporates a plurality of local snoop logic circuits, e.g., a snoop logic circuit 70 for each L1 data cache 56, and a snoop logic circuit 72 for L2 cache 57. A local response combining logic circuit 74 interfaces the local snoop logic circuits 70, 72 with the other system-level snoop logic circuits, as described in greater detail below.

With the illustrated implementation, the local snoop logic and response combining logic circuits for each processor maintain coherence within the L1 and L2 cache memory sources for the processor, while the system-level snoop logic and response combining logic circuits maintain coherence between the processors and the L3 caches. However, it should be appreciated that a single-level snoopy coherence mechanism may be used in the alternative. Moreover, it should also be appreciated that snoop logic circuits may service multiple memory sources in the alternative, so a one-to-one mapping between snoop logic circuits and memory sources is not required.

In general, memory access requests are issued by a requester and handled first locally within the processor level of the snoopy coherence mechanism. Should a cache miss occur at the processor level, a memory access request is then issued over the shared bus 42 and is "snooped" by each system-level snoop logic circuit. Each snoop logic circuit then interacts with a directory associated therewith to obtain and/or update the state information regarding a particular memory address specified by a memory access request. The combination of snoop logic and a directory or other suitable logic that stores state information about a particular memory source in data processing system 10 is also referred to herein as a "snooper" device, which in some implementations may also be considered to further include the control logic and/or memory storage for the particular memory source associated with such a device.

The snoop response collection logic circuits are used to gather local response signals from the local snoop logic circuits of the various snooper devices and generate a combined response signal for the local snooper device. In the illustrated implementation, the functionality of the snoop response collection logic is distributed between processor- or chip-level combining logic circuit 74, and the system-level combining logic circuit 66. As a result, in response to a particular memory access request, each processor-level circuit generates a processor response signal from the local response signals output by the various snoop logic circuits on the processor integrated circuit device. Then, the system-level circuit collects the local response signals as well as any additional response signals (e.g., from each L3 cache 52) and generates therefrom an overall combined response signal.

The local and combined response signals are used by each of the sources and the requester to permit data to be sourced and sinked in a distributed fashion. For example, at the system-level, when a source has the data available, the source requests the data bus from bus arbiter 48, and once the arbiter grants the bus to the source, the source places the data on the bus. The requester observes the data on the bus and recognizes the data by virtue of a tag that identifies the requester. The requester then receives the data from the bus. Moreover, other sources (e.g., an L3 cache) associated with the requester may also detect the tag and receive the data as well.

Figure 4:
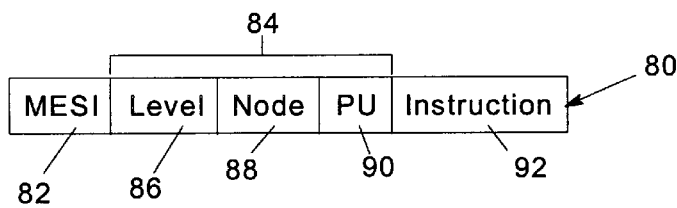
FIG. 4 is a block diagram of an illustrative response signal consistent with the invention.

Each of the local and combined response signals may include any of the various types of source identification information discussed above. For example, as shown in FIG. 4, a response signal 80 may be represented as a data word including a plurality of bits broken into appropriate fields. Response signal 80 includes a state information field 82, which may include, for example, any or all of the conventional MESI states. Response 80 also includes source identification information 84, including separate fields for source level information 86, node identification information 88 and processing unit, or processor, identification information 90. The source level information typically represents the level of cache memory that sources the data, e.g., L1, L2, L3 or main memory, and the node identification information typically represents the particular node (e.g., at a chip, board or system level) sourcing the data. The processor identification information typically indicates what processor last modified the data, and further is used to distinguish between multiple dedicated cache memories in a particular cache level (e.g., to distinguish between the multiple L1 caches in FIG. 3). It should be appreciated that different manners of identifying sources may be used in the alternative, e.g., simply assigning each potential source a unique identifier, among others.

Additional source identification information may also be included in each response, e.g., instruction information 92 from which it can be determined what instruction last modified the data in the memory. For example, it may be desirable to indicate when an instruction accesses data with a lock or semaphore (e.g., with a STCX or LARX instruction in the PowerPC architecture). In such a circumstance, it is typically known that the requested data will not be used by the requesting device after the operation, and it may be beneficial to simply provide the data directly to the requesting device (even bypassing all sources), as well as to store a copy in a lower level cache for immediate access by other devices (e.g., to an L3 cache).

It should be appreciated that each response signal is typically transmitted in parallel and implemented using a plurality of lines that separately carry each bit encoded in the signal. Other manners of encoding a response signal, e.g., serial, may also be used. Moreover, it should also be appreciated that the source identification information carried by the various response signals throughout a data processing system can vary from one another, particularly when certain information about a response signal source is inherently known by the recipient of the signal. As an example, the processor-level snoop response collection logic typically will receive the local response signals from each of the processing units, L1 caches and L2 caches via separate inputs, and as such will be able to determine which memory is the source for the requested data without having such information provided by that source in its response signal. Also, the node within which the logic circuit is disposed is also known. Thus, local response signals from each processor-level memory may not need to include node, processing unit and/or memory level information to the collection logic circuit.

It should be appreciated that the general implementation of a snoopy coherence mechanism is understood in the art. Moreover, other coherence mechanisms, e.g., directory-based mechanisms, may also be used in the alternative. Thus, the invention should not be limited to use with the particular snoopy coherence mechanisms described herein.

Figure 5:
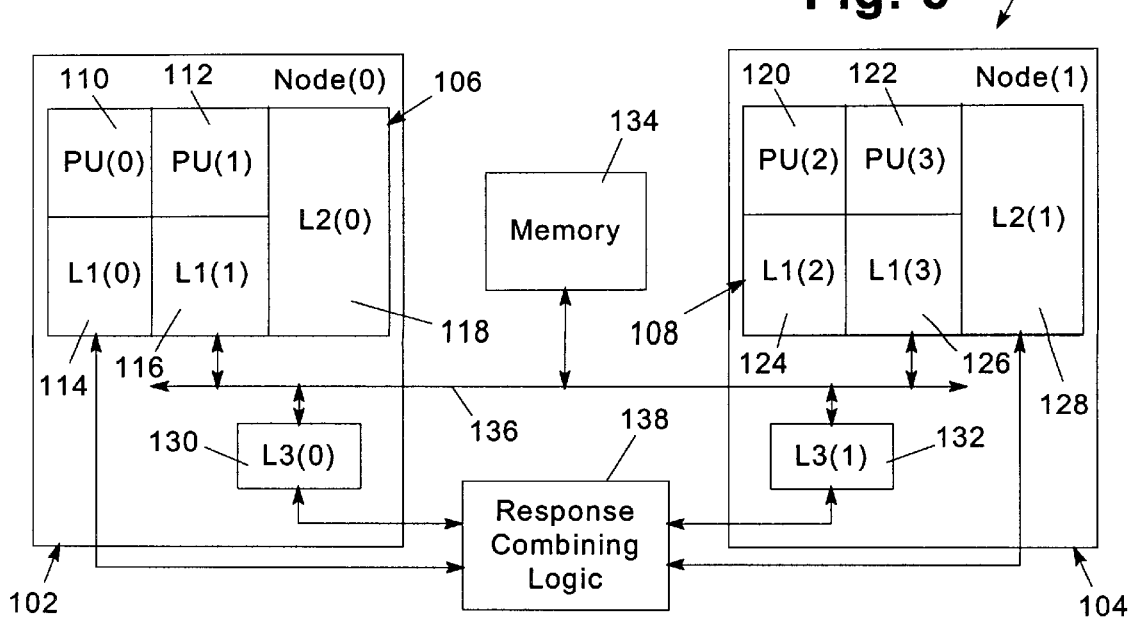
FIG. 5 is a block diagram of another data processing system consistent with the invention.

The operational logic for implementing selective data routing consistent with the invention is typically distributed among the various sources and response combination logic. Moreover, implementation of such functionality would be apparent to one of ordinary skill in the art having the benefit of the disclosure presented herein. To simplify such an understanding, a specific exemplary data processing system 100 is illustrated in FIG. 5, including two nodes 102, 104, each including a respective processor integrated circuit device 106, 108.

Device 106 is implemented as a two-processing unit device, including processing units 110, 112 respectively serviced by dedicated L1 caches 114, 116. A shared L2 cache 118 services each processing unit 110, 112. Similarly, device 108 includes two processing units 120, 122 respectively serviced by dedicated L1 caches 124, 126, and sharing a shared L2 cache 128. Each node 102, 104 further includes an L3 cache 130, 132, with each device 106, 108 and L3 cache 130, 132 interfaced with a main memory 134 over a shared bus 136.

System-level response combining logic is illustrated at 138, with the additional snoop/combining logic disposed within each cache and processor device not shown separately. With two nodes, four levels of memory (L1, L2, L3 and main memory), and two processors in each node, it should thus be appreciated that each potential source in the system can be represented in a response signal via a 2-bit level identifier, a 1-bit node identifier, and a 1-bit processor identifier, for a total of 4-bits of source identification information. However, to simplify the discussion hereinafter, rather than identifying each device/memory by a combination of level, node and/or processor information, the various processing units and caches in FIG. 5 are assigned unique numerical identifiers, including processing units (PU's) 0 . . . 3, L1 caches 0 . . . 3, L2 caches 0 . . . 1 and L3 caches 0 . . . 1.

It is assumed for the purposes of this exemplary embodiment that at least four states are supported, including invalid (I), shared (S), modified (M) and tag (T), which represents data that has been modified and must be written to memory sometime in the future. In addition, a fifth state, allocate (A), is also supported, whereby a directory entry is allocated for a particular cache line, but the actual data is not written to the cache. With this latter, optional state, bandwidth is conserved since the data need not be immediately written to the allocated entry in the cache. Space is still reserved in the cache, however, for that entry.

A state transition table resulting from a read request from processing unit PU(0) 108 is shown below in Table I, indicating the state transitions that occur as a result of issuing the read request when the data is stored in various memory sources in the data processing system, and based upon whether the data is modified in that source:

TABLE I

Cache State Transitions Resulting from PU(0) Read Request

| Data Source | Data State M | Cache State Transitions | | | | | | | |
|---|---|---|---|---|---|---|---|---|---|
| | | L1 | | | | L2 | | L3 | |
| | | 0 | 1 | 2 | 3 | 0 | 1 | 0 | 1 |
| L1(1) | Y | I/T | M/S | I | I | I | I | I | I |
| L1(1) | N | I/S | S/S | S or I | S or I | S or I | S or I | S or I | S or I |
| L2(0) | Y | I/S | I | I | I | M/T | I | I | I |
| L2(0) | N | I/S | I | S or I | S or I | S/S | S or I | S or I | S or I |
| L3(0) | Y | I/S | I | I | I | I/S | I | M/T | I |
| L3(0) | N | I/S | I | S or I | S or I | I/S | S or I | S/S | S or I |
| L3(1) | Y | I/S | I | I | I | I | I | I/T | M/S |
| L3(1) | N | I/S | I | S or I | S or I | I | S or I | I/S | S/S |
| L2(1) | Y | I/S | I | I | I | I/T | M/S | I | I |
| L2(1) | N | I/S | I | S or I | S or I | I/S | S/S | I | I |
| L1(2) | Y | I/T | I | M/S | I | I | I | I | I |
| L1(2) | N | I/S | I | S/S | I | I | I | I | I |
| L1(3) | Y | I/T | I | I | M/S | I | I | I | I |
| L1(3) | N | I/S | I | I | S/S | I | I | I | I |
| Mem. | — | I/S | I | I | I | I/S | I | I/S | I |

The nomenclature "x/y" indicates that a transition occurs from state x to state y in the particular source as a result of the operation.

In general, the state transitions illustrated in Table I route data selectively within a node based upon the level of memory that is sourcing the request. Thus, whenever data is sourced from another L1 memory, the data is routed only to the requester's L1 cache. Whenever data is sourced from an L2 memory, the data is routed only to the requester's L1 and L2 caches, and whenever data is source from an L3 memory, the data is routed to each of the L1, L2 and L3 caches associated with the requester. Data sourced from main memory may be routed to each of the L1, L2 and L3 caches, or possibly it may be desirable to omit routing the data to the L2 cache in such a circumstance.

Figure 6:
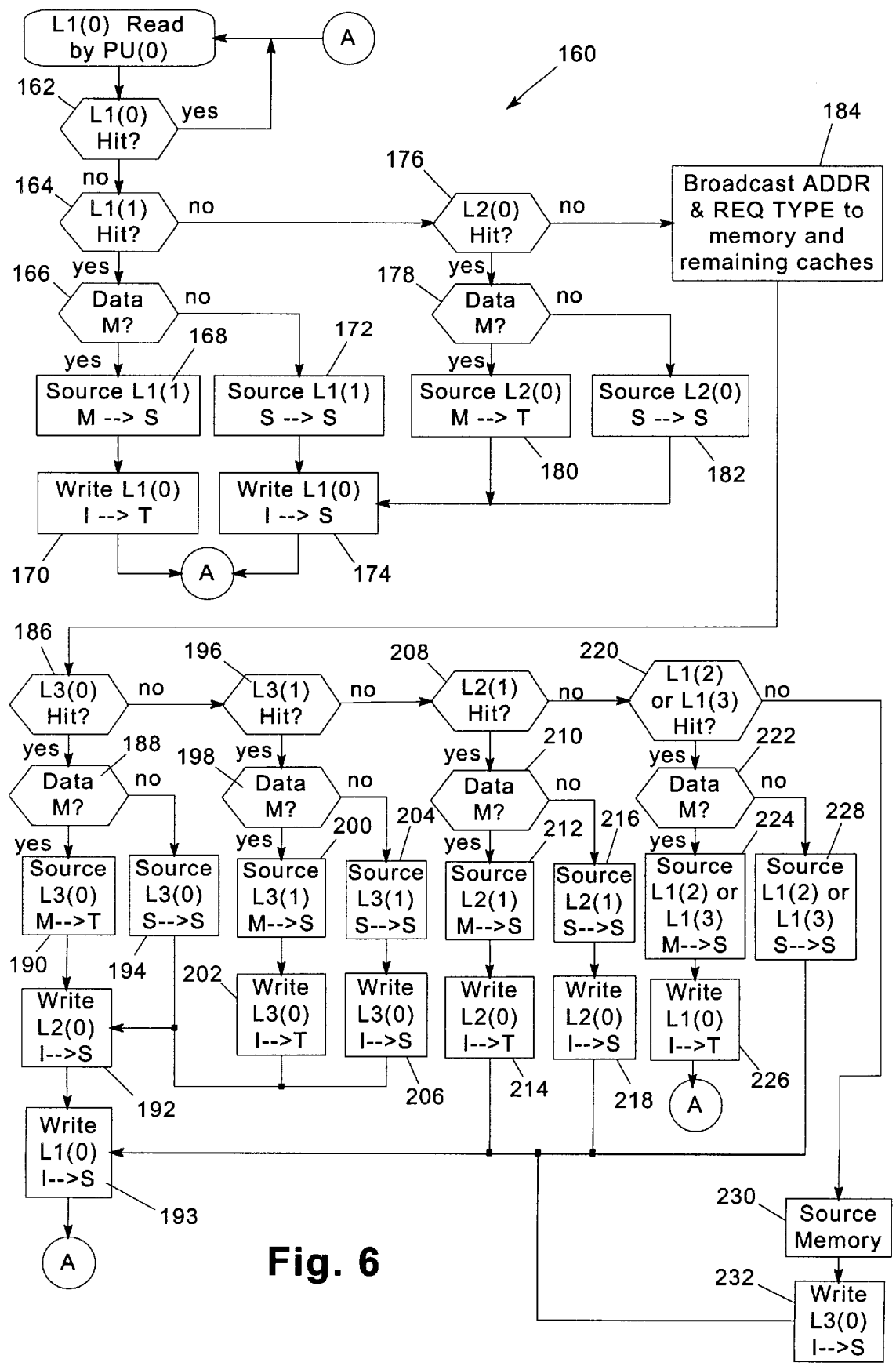
FIG. 6 is a flowchart illustrating the logic flow associated with handling a read request from one of the processing units in the data processing system of FIG. 5.

The logic flow that implements the transition rules set forth in Table I is represented at 160 in FIG. 6. It will be appreciated that while the logic flow is shown as occurring in sequence, the logic is typically distributed among multiple logic circuits that operate independently and concurrently with one another. The sequential representation shown in FIG. 6 is merely presented to simplify the explanation of the operation of the logic circuitry. For example, determination of whether a request hits or misses different caches in a processor and/or system typically occurs in parallel by all caches and other sources of memory.

As shown in FIG. 6, it is first determined in block 162 whether a hit occurs in L1(0), the L1 cache associated with PU(0). If so, no additional processing by the shared memory system is required. If a miss occurs, however, block 164 determines whether a hit occurs in L1 (1), the other L1 cache on the same processor integrated circuit device as PU(0). If so, block 166 next determines whether the cache line for the requested data is modified in L1(1). If so, in block 168 the data is sourced (retrieved) from L1(1), and the state of the cache line transitions from modified to shared. Next, block 170 writes the requested cache line into L1 (0) and transitions the cache line from invalid to tag. Processing of the request is then complete.

Returning to block 166, if the data is not modified, block 172 sources the cache line from L1(1) and transitions L1(1) to the shared state. Next, block 174 writes the cache line into L1(0) and transitions the cache to the shared state as well, indicating that both L1(0) and L1(1) include valid copies of the cache line. Processing of the request is then complete.

Returning to block 164, if the request misses L1(1), block 176 determines whether a hit occurs in L2(0), the L2 cache on the same processor integrated circuit device as PU(0). If so, block 178 next determines whether the cache line for the requested data is modified in L2(0). If so, in block 180 the data is sourced from L2(0), and the state of the cache line transitions from modified to tag. Next, control passes to block 174 to write the cache line into L1(0) and transition the cache line in L1(0) to the shared state. Processing of the request is then complete. Returning to block 178, if the data is not modified, block 182 sources the cache line from L2(0) and transitions L2(0) to the shared state. Next, block 174 writes the cache line into L1 (0) and transitions the cache to the shared state. Processing of the request is then complete.

Returning to block 176, if it is determined that the request misses each of L1(0), L1(1) and L2(0), the request cannot be handled within the processor integrated circuit device, and as such the request must be fulfilled either by main memory or by the other processor device. Accordingly, block 184 broadcasts the request, specifically the requested address and a request type (e.g., read, read with intent to modify, write, claim, etc.) over system bus 136 (FIG. 5), which is in turn snooped by each of the memory sources coupled to the bus (here processor integrated circuit device 108 and L3 caches 130, 132). Snoop logic within device 108 further broadcasts appropriate request information to each of the sources within the device, in essentially the same manner as a conventional multi-level snoopy coherence protocol.

As shown in block 186, it is next determined whether the broadcast request has hit L3(0), the L3 cache associated with PU(0). If so, block 188 determines whether the data has been modified. If so, block 190 sources the cache line for the requested data from L3(0) and transitions L3(0) from the modified to the tag state. Next, blocks 192 and 193 write the cache line respectively into L2(0) and L1(0) and transition each cache to the shared state, essentially maintaining inclusion in the node for PU(0). Processing of the request is then complete. Returning to block 188, if the data is not modified, block 194 sources the cache line for the requested data from L3(0) and transitions L3(0) to the shared state, and blocks 192 and 193 write the cache line respectively into L2(0) and L1(0) and transition each cache to the shared state. Processing of the request is then complete.

Returning to block 186, if L3(0) is not hit, block 196 determines whether the broadcast request has hit the other L3 cache, L3(1). If so, block 198 determines whether the data has been modified. If so, block 200 sources the cache line for the requested data from L3(1) and transitions L3(1) from the modified to the shared state. Next, block 202 writes the cache line into L3(0) and transitions L3(0) from the invalid state to the tag state. Control then passes to blocks 192 and 193 to write the cache line respectively into L2(0) and L1(0) and transition each cache to the shared state, completing handling of the request. And returning to block 198, if the data is not modified, block 204 sources the cache line for the requested data from L3(1) and transitions L3(1) to the shared state, and blocks 206, 192 and 193 write the cache line respectively into L3(0), L2(0) and L1(0) and transition each cache to the shared state. Processing of the request is then complete.

Returning to block 196, if L3(1) is not hit, block 208 next determines whether the request has hit the other L2 cache, L2(1). If so, block 210 determines whether the data has been modified. If so, block 212 sources the cache line for the requested data from L2(1) and transitions L2(1) from the modified to the shared state. However, given that the data was stored in an L2 cache rather than an L3 cache, an assumption is made that the data is relatively "warm" (more frequently accessed), and rather than writing the data into the L3 cache, the L3 cache is bypassed, and the data is written into L2(0) in block 214, including transitioning L2(0) from the invalid state to the tag state. Control then passes to block 193 to write the cache line into L1(0) and transition that cache to the shared state, completing handling of the request. And returning to block 210, if the data is not modified, block 216 sources the cache line for the requested data from L2(1) and transitions L2(1) to the shared state, and blocks 218 and 193 write the cache line respectively into L2(0) and L1(0) and transition each cache to the shared state. Processing of the request is then complete. As such, it can be seen that, when data is sourced from an L2 cache in this example, bandwidth and storage space associated with the L3 cache for the associated processing unit are conserved.

Returning to block 208, if L2(1) is not hit, block 220 next determines whether the request has hit either L1 cache in the other processor integrated circuit device, L1(2) or L1(3). If so, block 222 determines whether the data has been modified. If so, block 224 sources the cache line for the requested data from the appropriate L1 cache, L1(2) or L1(3), and transitions such cache from the modified to the shared state. However, given that the data was stored in an L1 cache rather than an L2 or L3 cache, an assumption is made that the data is relatively "hot" (most frequently accessed), and rather than writing the data into the L2 and L3 caches, the L2 and L3 caches are bypassed, and the data is written directly into L1(0) in block 226, including transitioning L1(0) from the invalid state to the tag state. Processing of the request is then complete. And returning to block 222, if the data is not modified, block 228 sources the cache line for the requested data from L1(2) or L1(3) and transitions such cache to the shared state, and block 193 write the cache line into and L1(0) and transitions the cache to the shared state. Processing of the request is then complete. As such, it can be seen that, when data is sourced from an L1 cache in this example, bandwidth and storage space associated with both the L2 and L3 caches for the associated processing unit are conserved.

Returning again to block 220, if the request does not hit any cache, block 230 sources the request from main memory. The L3 and L1 caches associated with the requesting processing unit PU(0), L3(0) and L1(0), are then written to and the states thereof are transitioned to the shared state, completing processing of the request. In this circumstance, however, bandwidth and storage space associated with the L2 cache are conserved.

Similar to Table I, Table II below shows illustrative state transitions responsive to a read with intent to modify (RWITM) request issued by processing unit PU(0). As is known in the art, a RWITM request is often issued to retrieve data to a local cache for a processing unit for subsequent modification by the processing unit.

TABLE II

Cache State Transitions Resulting from PU(0) RWITM Request

| Data Source | Data State | Cache State Transitions | | | | | | | |
|---|---|---|---|---|---|---|---|---|---|
| | | L1 | | | | L2 | | L3 | |
| | M | 0 | 1 | 2 | 3 | 0 | 1 | 0 | 1 |
| L1(1) | Y | I/M | M/I | I | I | I | I | I | I |
| L1(1) | N | I/M | S/I | I | I | I | I | I | I |
| L2(0) | Y | I/M | I | I | I | M/I | I | I | I |
| L2(0) | N | I/M | I | I | I | S/I | I | I | I |
| L3(0) | Y | I/M | I | I | I | I/A | I | M/A | I |
| L3(0) | N | I/M | I | I | I | I/A | I | S/A | I |
| L3(1) | Y | I/M | I | I | I | I/A | I | I/A | M/I |
| L3(1) | N | I/M | I | I | I | I | I | I/A | S/I |
| L2(1) | Y | I/M | I | I | I | I/A | M/I | I | I |
| L2(1) | N | I/M | I | I | I | I/A | S/I | I | I |
| L1(2) | Y | I/M | I | M/I | I | I | I | I | I |
| L1(2) | N | I/M | I | S/I | I | I | I | I | I |
| L1(3) | Y | I/M | I | I | M/I | I | I | I | I |
| L1(3) | N | I/M | I | I | S/I | I | I | I | I |
| Mem. | — | I/M | I | I | I | I/A | I | I/A | I |

In this implementation, the allocated (A) state indicates that an entry in the appropriate source is allocated, but that the actual data is not written into that entry in the source. As a result, bandwidth to that source is conserved. In the alternative, either allocating an entry can be omitted, or inclusion may be utilized to maintain additional copies in other cache levels.

It should be appreciated that the logic flow that implements the transition rules set forth in Table II would proceed in much the same manner as the logic flow illustrated for Table I in FIG. 6, with appropriate substitutions made based upon the state transitions set forth in Table II. Moreover, it should be appreciated that additional logic may be required to fully implement a shared memory system with selective data routing as described herein. For example, state transition tables similar to Tables I and II may be developed to handle read and RWITM requests from each of processors PU(1), PU(2) and PU(3), as well as to handle other requests that may be made in the specific system. Furthermore, additional logic may be required to implement appropriate state transitions when the initial states of some sources differ from those set forth in Tables I and II. Moreover, as discussed above different numbers and arrangements of processing units, cache memories, shared memories, etc. may also be used, which would necessarily require customized logic circuitry to handle selective data routing in the manner described herein. However, it would be well within the abilities of the ordinary artisan having the benefit of the instant disclosure to implement any of such customized logic circuitry to implement desired functionality consistent with the present invention.

Selective data routing consistent with the invention has a number of unique advantages over conventional designs. Bandwidth, and optionally storage (when entries are not allocated) in caches and other memory sources may be conserved by reducing the amount of redundant data that is maintained in multiple caches.

Moreover, various modifications may be made to the illustrated embodiments without departing from the spirit and scope of the invention. For example, it may also be beneficial to utilize source identification information to selectively invalidate cache lines in non-sourcing caches. As one illustrative embodiment, it may be desirable to utilize source identification information to detect when a source in a particular node is sourcing a request from another node, so that the other memories in the sourcing node can be invalidated along with the specific source for the requested data.

In addition, in some implementations it may be desirable to support the retrieval of data directly to a requester, without storing the data in any external memory source associated with that requester. For example, it may be desirable to completely bypass any intervening memory sources (e.g., any of the L1, L2 and L3 caches associated with a processing unit), and instead forward data directly to a processing unit, responsive to a request that responds with a "not-cached" source identification (e.g., data that is found in a register/buffer internal to an L3 cache controller, or in another processor's register/buffer, such as respectively shown at 53 and 55 in FIGS. 2 and 3). It may also be desirable to do so when requested data is found in another processing unit's L1 cache, and modified by a specific instruction (e.g., a STCX instruction in the PowerPC architecture). In either event, if the data was found modified, it would be desirable to mark the data in the tag state. A directory associated with any processing unit's registers/buffers would also be used to track such variables to permit the registers/buffers to be snooped if another requester requests the same data. Once such data was used, the data (if modified) may be written to a fast access buffer in the L3 cache controller so that the buffer can readily provide the data for use by any requester when it is again requested.

As another alternative, a combined response may be selectively provided to only a subset of the memory sources, e.g., simply to the requester device. Also, other mechanisms may be used to determine where to selectively route data, e.g., based upon other concerns such as available bandwidth in each potential memory, or various "fairness" algorithms.

Other modifications will be apparent to one of ordinary skill in the art. Therefore, the invention lies in the claims hereinafter appended.

What is claimed is:

1. A method of routing data in a multi-requester circuit arrangement including a plurality of requesters coupled to a plurality of memory sources, wherein each requester is associated with at least a portion of the plurality of memory sources, the method comprising:

(a) responding to a memory request by a first requester among the plurality of requesters, including providing source identification information associated with the memory source that is returning the requested data; and (b) responsive to the source identification information, selectively routing the requested data to only a subset of the memory sources associated with the first requester.

2. The method of claim 1, wherein the plurality of requesters includes first and second processing units.

3. The method of claim 2, wherein the plurality of memory sources are organized into at least first and second levels, the first level including first and second memory sources respectively associated with the first and second processing units, and the second level including a third memory source shared by the first and second processing units.

4. The method of claim 3, wherein the first and second memory sources are primary cache memories, the plurality of sources further including first and second secondary cache memories respectively associated with the first and second processing units.

5. The method of claim 1, wherein the source identification information includes a memory level indicator that indicates a level of memory sourcing the requested data.

6. The method of claim 5, wherein at least one of the plurality of requesters is a processing unit, and wherein the source identification information further includes a processing unit indicator that identifies a processing unit if any from the plurality of requesters that modified the requested data.

7. The method of claim 5, wherein the source identification information further includes an instruction indicator that identifies an instruction if any that modified the requested data.

8. The method of claim 1, wherein the memory sources associated with the first requester includes a cache memory, the method further comprising allocating a directory entry in the cache memory without storing the requested data in the cache memory responsive to the source identification information.

9. The method of claim 1, wherein providing the source identification information associated with the memory source for the requested data includes:

(a) generating in each of at least a portion of the memory sources a coherency response, at least one of the coherency responses including the source identification information; and (b) generating a combined response from the coherency responses, wherein selectively routing the requested data is responsive to the combined response.

10. The method of claim 9, further comprising transmitting the combined response at least to the memory source that is returning the requested data.

11. The method of claim 1, further comprising invalidating data stored in at least one memory source responsive to the source identification information.

12. The method of claim 1, further comprising selectively routing the requested data directly to the first requester responsive to the source identification information.

13. A method of routing data in a multi-processor circuit arrangement including first and second processors, each processor coupled to and associated with a plurality of memories, the method comprising:

(a) responding to a memory request by the first processor by outputting requested data from one of the plurality of memories associated with the second processor, including indicating which of the plurality of memories associated with the second processor is sourcing the requested data; and (b) selectively routing the requested data to only a subset of the plurality of memories associated with the first processor based upon which of the plurality of memories associated with the second processor is sourcing the requested data.

14. The method of claim 13, wherein each of the first and second processors is associated with at least primary and secondary cache memories.

15. The method of claim 14, wherein each of the first and second processors is further associated with a tertiary cache memory.

16. The method of claim 14, further comprising allocating a directory entry in at least one of the primary and secondary cache memories associated with the first processor without storing the requested data therein based upon which of the plurality of memories associated with the second processor is sourcing the requested data.

17. The method of claim 14, further comprising invalidating data stored in at least one of the primary and secondary cache memories associated with the second processor based upon which of the plurality of memories associated with the second processor is sourcing the requested data.

18. A method of routing data in a multi-requester circuit arrangement including a plurality of requesters coupled to a plurality of memory sources, wherein each requester is associated with at least a portion of the plurality of memory sources, the method comprising:

(a) responding to a memory request by a first requester among the plurality of requesters, including providing source identification information associated with the memory source that is returning the requested data; and (b) responsive to the source identification information, selectively routing the requested data directly to the first requester without routing the requested data to any of the memory sources associated with the first requester.

19. A circuit arrangement, comprising:

(a) a plurality of memory sources;

(b) a plurality of requesters coupled to the plurality of memory sources, each requester associated with at least a portion of the plurality of memory sources; and (c) a data routing circuit configured to selectively route data requested by the first requester to only a subset of the memory sources associated with the first requester responsive to source identification information provided by a memory source that is returning the requested data.

20. The circuit arrangement of claim 19, wherein the plurality of requesters includes first and second processing units, and wherein the plurality of memory sources are organized into at least first and second levels, the first level including first and second memory sources respectively associated with the first and second processing units, and the second level including a third memory source shared by the first and second processing units.

21. The circuit arrangement of claim 19, wherein the source identification information includes at least one of a memory level indicator that indicates a level of memory sourcing the requested data, a processing unit indicator that identifies a processing unit if any that modified the requested data, and an instruction indicator that identifies an instruction if any that modified the requested data.

22. The circuit arrangement of claim 19, wherein the memory sources associated with the first requester includes a cache memory, and wherein the data routing circuit is further configured to allocate a directory entry in the cache memory without storing the requested data in the cache memory responsive to the source identification information.

23. The circuit arrangement of claim 19, further comprising:

(a) a snoop logic circuit configured to generate in each of at least a portion of the memory sources a coherency response, at least one of the coherency responses including the source identification information; and (b) a response combining logic circuit configured to generate a combined response from the coherency responses, wherein the data routing circuit is responsive to the combined response.

24. The circuit arrangement of claim 23, wherein the response combining logic circuit is configured to transmit the combined response at least to the memory source that is returning the requested data.

25. The circuit arrangement of claim 19, wherein the data routing circuit is further configured to invalidate data stored in at least one memory source responsive to the source identification information.

26. The circuit arrangement of claim 19, wherein the data routing circuit is further configured to selectively route the requested data directly to the first requester responsive to the source identification information.

27. A data processing system, comprising:
(a) a plurality of memory sources;
(b) a plurality of requesters coupled to the plurality of memory sources, each requester associated with at least a portion of the plurality of memory sources; and
(c) a data routing circuit configured to selectively route data requested by the first requester to only a subset of the memory sources associated with the first requester responsive to source identification information provided by a memory source that is returning the requested data.

* * * * *